United States Patent Office 2,848,299
Patented Aug. 19, 1958

2,848,299

CORROSION INHIBITION IN WATER SYSTEMS

Harry Lewis Kahler, Feasterville, Chester A. Bishof, Churchville, and William A. Tanzola, Havertown, Pa., assignors, by mesne assignments, to Betz Laboratories, Inc., a corporation of Pennsylvania No Drawing. Application January 11, 1956
Serial No. 558,415

8 Claims. (Cl. 21—2.7)

The present invention relates to the prevention of corrosion and slugging in industrial water systems. Aspects of the invention relate both to the process and to the industrial water.

A purpose of the invention is to reduce the average metal penetration, both in iron and steel, and also in aluminum and copper base alloys, through piping, heat exchangers, and other metal surfaces of an industrial water system.

A further purpose is to reduce pitting and tuberculation in such systems.

A further purpose is to reduce the sludging of aluminum in an industrial water system.

A further purpose is to reduce the tendency of industrial waters containing sulphides as well as aluminum to cause penetration, pitting and tuberculation on metal surfaces.

A further purpose is to introduce into an industrial water system a water soluble fluoride compound, preferably in the concentration of 10 to 200 p. p. m. and most desirably in the concentration of from 20 to 50 p. p. m., and a water soluble chromate compound preferably in the concentration of 1 to 200 p. p. m. and most desirably in the concentration from 10 to 40 p. p. m., either in the absence of aluminum or in the presence of aluminum as an impurity, or with the deliberate addition of aluminum, and to maintain in the water a pH between 5 and 8 and preferably, especially where aluminum is present, a pH between 5 and 6.5.

A further purpose is to add from 1 to 10 p. p. m. of aluminum ion to an industrial water which is deficient in aluminum.

A further purpose is to introduce into an industrial water containing sulphide and aluminum ions, between 1 and 20 p. p. m. of water soluble phosphate compound, in addition to the water soluble fluoride compound and the water soluble chromate compound, the concentration of trivalent chromium ions preferably being in the range of 0.4 to 8 p. p. m.

Further purposes appear in the specification and in the claims.

Turbid waters and waters containing suspended solids usually must be pretreated prior to use for cooling water purposes. The pretreatment used ordinarily consists of coagulation with aluminum salts, settling and filtration, although filtration is in some cases omitted. If the proper pH for coagulation is not maintained constantly, there is a danger that some aluminum ion will be present in the effluent of the treating plant. Where filters are not in use, of course, some suspended aluminum precipitate may be present in the treatment plant effluent, in addition to the soluble aluminum. The presence of aluminum in soluble or insoluble form may seriously interfere with the effectiveness of the subsequent treatment of the cooling water from the standpoints both of corrosion and formation of deposits.

Depending on the local conditions, the effluent from such a pretreatment plant may be used in a cooling system of the once-through type or of the recirculating type. The undesirable effect of aluminum will be present in either type of system but will be aggravated in a recirculating system due to the concentration effect of such a system.

Where the subsequent treatment of the cooling water is accomplished by the use of phosphates or phosphate-chromate combinations, the presence of aluminum seriously interferes with the effectiveness of the treatment. For example, aluminum forms a complex ion with polyphosphate. The polyphosphate combined in this complex ion cannot exert its normal function. Kahler U. S. Patent No. 2,711,391, granted June 21, 1955, for Phosphate-Chromate Corrosion Protection in Water Systems, describes the unusual effect of phosphate and chromate in reducing pitting and tuberculation. This effect cannot be secured with the separate use of either phosphate or chromate at equivalent concentrations. Aluminum by forming a complex with the polyphosphate component of the phosphate-chromate treatment, in effect decreases or eliminates the phosphate available to function with the chromate and thus decreases the inhibiting power of the treatment.

Aluminum is also undesirable because of its precipitation with orthophosphates in a cooling system. A heavy sludge is produced which tends to adhere to the heat exchange surfaces. This aluminum orthophosphate sludge is more undesirable than aluminum hydroxide because of its greater tendency to adhere to metal surfaces.

In studies made to overcome the undesirable effect of aluminum, it was discovered by the present inventors that if water soluble fluoride is used with water soluble chromate, in place of phosphate, an inhibitory effect is secured similar to that of phosphate. In addition, the fluoride possesses the valuable property of solubilizing aluminum, thus reducing the precipitation. Since little or no phosphate is used, aluminum orthophosphate deposit is kept to a minimum.

CONDITIONS OF TEST

The tests reported are based upon results obtained by three different corrosion systems. One was a recirculating system operating at a flow rate of 0.5 feet per second at 120° F. The second system was a once-through system with a flow rate of 0.35 feet per second at a temperature of 120° F. The third system was a spinner type using a constant volume of water. The specimens were spun at 1 foot per second. All of the systems used the same type of corrosion water made from Philadelphia tap water to contain 100 p. p. m. calcium, 30 p. p. m. magnesium, 30 p. p. m. alkalinity, all as calcium carbonate, 24 p. p. m. $SO_4$, 5.5 p. p. m. oxygen, 500 p. p. m. Cl, 0.2 p. p. m. copper and 7 p. p. m. aluminum. Sometimes $H_2S$ was introduced as noted.

The corrosion specimens were one-half inch by 3 inches by 1/16 inch high carbon steel of normal corrodibility having the surfaces ground to a finish of 20 microinches to allow evaluation of different types of corrosion attack. The chemical composition of the steel was 0.04 percent sulphur, 0.3 percent silicon, 0.9 percent carbon, 1.4 percent manganese, phosphorus absent. All percentages here given are by weight.

Before immersion the specimens were cleaned with Tripoli (an abrasive) and trisodium phosphate followed by a water rinse and then an alcohol rinse, and finally drying. After exposure was complete, the observations on the type of attack, the products, tuberculation and pitting were made at a magnification of 20 diameters. The chemicals used in these tests were sodium chromate, sodium dichromate, sodium fluoride, sodium tripolyphosphate to furnish the complex phosphate, disodium phosphate to furnish the orthophosphate, acidified chromic sulphate and in some cases aluminum sulphate.

FLUORIDE-CHROMATE IN THE PRESENCE OF ALUMINUM

Table I shows the result of the treatment of the invention compared to phosphate-chromate, fluoride alone and chromate alone.

Test 31 shows that the phosphate-chromate treatment run at a favorable pH of 6 with aluminum present gave low steel penetration with pitting and tuberculation. If no aluminum had been present, this same treatment would have completely stifled the pitting attack. This is true not only at pH 6 but also in the range from pH 5.2 to 7.8, as shown in the aforesaid Kahler patent. This phosphate-chromate treatment also, more significantly, allowed considerable sludging. In actual practice, this sludging interferes with heat transfer, and even makes use of the phosphate treatment impractical when substantial aluminum is present.

The sodium fluoride treatment alone at pH 5 and 6 in Table I generally afforded some protection to the steel (about 75 percent). At pH 7 and 8 the protection was lower. At none of these pH levels was the pitting attack stifled. Fluoride alone was able to suppress the formation of aluminum sludge at pH 5, 5.5, 6.0 and 6.5. But at pH 7 and 8, fluoride was not able to reduce the formation of aluminum sludge to any noticeable degree.

Table I indicates that the sodium chromate treatment alone at pH 5, 6, 7 and 8 reduces the steel losses, but does not always stifle the pitting attack. However, the greatest defect of this treatment lies in its inability to stop aluminum sludging which interferes with heat transfer.

Speaking generally, over the pH range 5 to 6.5, the fluoride-chromate treatment of the present invention not only stifles the corrosion attack but satisfactorily controls aluminum sludging. This treatment is therefore practical in waters containing aluminum, particularly because it restrains the aluminum from precipitating. When compared with the phosphate-chromate treatment which allows precipitation of aluminum, to the extent of plastering the walls of the cooling water equipment, the fluoride-chromate treatment of the present invention makes a very beneficial reduction in aluminum precipitate.

This combination treatment, with water soluble fluoride and water soluble chromate, definitely benefits in corrosion protection as compared with the single fluoride treatment. As compared with the single chromate treatment and the phosphate-chromate treatment, the fluoride-chromate treatment of the present invention makes a satisfactory reduction in precipitation of aluminum.

Other metals such as copper base alloys and aluminum base alloys are also protected by the fluoride-chromate treatment as shown in Table II. The average penetration for copper was very low. The average penetration for aluminum was slightly high, which is expected in one day testing. On prolonged testing this loss reduces to a satisfactory level. The treatment stifled pitting attack on both metals.

Any suitable water soluble fluoride may be used, such as sodium fluoride, sodium bifluoride (due allowance being made for acidity), potassium fluoride, potassium bifluoride, lithium fluoride, and ammonium fluoride. The alkali metal fluorides are preferred but other water soluble fluorides may be used.

The concentration of water soluble fluoride compound will preferably be between 10 and 200 p. p. m. expressed as sodium fluoride, most desirably between 20 and 50 p. p. m.

Any suitable water soluble chromate or dichromate may be used, suitable examples being sodium dichromate dihydrate, sodium chromate anhydrous, sodium chromate tetrahydrate, sodium chromate hexahydrate, sodium chromate decahydrate, potassium dichromate, potassium chromate, ammonium dichromate and chromic acid.

The concentration of water soluble chromate compound will preferably be between 1 and 200 p. p. m., and most desirably between 10 and 40 p. p. m., expressed as $Na_2Cr_2O_7 \cdot 2H_2O$. The pH maintained in the water should be between 5 and 8, and especially when aluminum is present it will preferably be between 5 and 6.5.

FLUORIDE-CHROMATE TREATMENT IN WATERS CONTAINING ALUMINUM AND SULPHIDE

Many refinery cooling waters are subject not only to aluminum contamination but also to contamination with hydrogen sulphide and/or organic sulfides. Natural waters of this character also occur. When sulphide contamination is present, the chromate of the fluoride-chromate treatment is reduced to trivalent chromic ion. Under these conditions it is very desirable to alter the treatment of the invention slightly for two reasons. First it is desirable to change the treatment to obtain maximum corrosion protection. Second, it is desirable to make the change for minimum interference with heat transfer.

According to the altered technique, if the practice were to feed 40 p. p. m. water soluble fluoride compound expressed as sodium fluoride and 20 p. p. m. sodium dichromate, without the sulphide contamination, in the presence of the sulphide contamination the chromate compound expressed as $Na_2Cr_2O_7 \cdot 2H_2O$ would be reduced for example to 12.8 p. p. m. so that on reduction it would produce 4.5 p. p. m. trivalent chromic ion which gives satisfactory protection with a minimum interference with heat transfer. To promote the best chromic coating, an addition of say 5 p. p. m. of water soluble phosphate compound, preferably molecularly dehydrated phosphate such as sodium tripolyphosphate is made, so that the chromic ion forms some chromic phosphate after some reversion to the orthophosphate takes place. We have found the chromic phosphate coating to be more beneficial than other chromic compounds.

Under these conditions it may be desirable to increase the quantity of water soluble fluoride compound from say 40 to 60 p. p. m., although the amount of water soluble fluoride will depend on the aluminum contamination.

Table III reports laboratory results showing that this type of treatment was satisfactory in reducing steel loss, and in completely wiping out any pitting attack. Plant application of this same type of treatment has proved very successful under quite corrosive conditions imparted from high concentrations of aluminum, hydrogen sulphide and organic sulphide. Equally successful results have been obtained from lower amounts of fluoride, water soluble phosphate and chromic ion.

In general when sulphide ion is present it is preferable to use from 10 to 200 p. p. m. of water soluble fluoride compound, expressed as sodium fluoride, most desirably from 20 to 50 p. p. m., from 1 to 20 p. p. m. of water soluble phosphate compound expressed as sodium tripolyphosphate, and from 1 to 20 p. p. m. of water soluble chromate compound expressed as $Na_2Cr_2O_7 \cdot 2H_2O$, to furnish from 0.4 to 7 p. p. m. of trivalent chromium ions.

The fluoride and chromate may be fed as above described. The phosphate may be orthophosphate or molecularly dehydrated phosphate. As the orthophosphate, monosodium phosphate, disodium phosphate, trisodium phosphate, the corresponding potassium or lithium compounds or phosphoric acid may be used. As a molecularly dehydrated phosphate, sodium or potassium pyrophosphate, tripolyphosphate, tetraphosphate, septaphosphate, decaphosphate, hexametaphosphate, metaphosphoric acid or pyrophosphoric acid or any other water soluble polyphosphate may be used.

EFFECTIVENESS OF FLUORINE-CHROMATE v. PHOSPHATE-CHROMATE IN WATERS NOT CONTAMINATED WITH ALUMINUM

Although the fluoride-chromate treatment of the invention along with its various modifications is outstandingly successful in waters contaminated with aluminum, it functions satisfactorily in waters where aluminum is absent or is present only in insignificant quantities.

Table IV shows results of tests made at pH 6 with the same water used in the test of Table I, except that aluminum was absent. The table shows that with no treatment the absence of aluminum decreased the corrosivity of the water. Test 1 which applies no treatment indicates an average penetration of only 0.063 inch per year, compared with a corresponding value of 0.193 inch per year in Table I. Test 2 for the phosphate chromate combination, as described in the Kahler patent aforesaid, produced excellent results as would be expected when aluminum is absent. The average penetration was reduced to 0.003 inch per year, and pitting was completely stifled.

Fluoride alone at 60 p. p. m. did not reduce the average penetration, nor did it stifle pitting.

Table IV, tests 4 to 7 inclusive with the fluoride-chromate combination show steady reduction in average penetration values with increase in the proportion of chromate. Tests 4 and 5 did not completely stifle pitting but it was brought under control in tests 6 and 7. In waters without aluminum it is best to use a ratio of water soluble fluoride to water soluble chromate in the region between ⅓ fluoride to ⅔ chromate and ⅙ fluoride to ⅚ chromate by weight.

The desirable effects obtained are a function of the conjoint use of these two materials since tests 3 and 8 show that neither water soluble fluoride alone nor water soluble chromate alone produced the result.

It should be noted that not only does water soluble fluoride produce a benefit in waters containing aluminum, but aluminum is beneficial in order to obtain best results in waters containing fluoride or fluoride-chromate combinations. For example, in Table IV where the waters are free of aluminum, tests 1 and 3 show that fluoride increased rather than decreased the average penetration rate. On the other hand, in Table I, tests 1 and 2 show that in the presence of aluminum, fluoride decreased the average penetration rate.

Comparison of Table I, test 11 with Table IV, test 4; Table I, test 12, with Table IV, test 5; and Table I, test 13 with Table IV, test 6, indicate that in each case the fluoride-chromate combination gives lower penetration and better protection against pitting when aluminum is present.

It is therefore evident that not only does fluoride overcome the detrimental effects of aluminum but the presence of aluminum assists the fluoride-chromate combination to produce excellent results in preventing corrosion. There is an advantage, therefore, in adding aluminum to the fluoride-chromate treatment to obtain best results with a fairly corrosive water which has no aluminum present. The concentration of aluminum required to give satisfactory corrosion control will vary with the conditions. Table V shows that for a given set of conditions the concentration of aluminum is a factor and must be considered. It is evident from Table V that in the pH range from 5 to 6, the preferable concentration of aluminum ion is 2 to 5 p. p. m. to stifle pitting. At pH 7 and above a concentration of aluminum ion of 1 to 2 p. p. m. is preferable. Generally speaking, the average penetration of steel was satisfactory for all levels of aluminum. It is evident that aluminum additions of 1 to 10 p. p. m. of aluminum ion are beneficial from the standpoint of corrosion, the upper concentration being limited by the desire to maintain cleanliness of equipment.

For systems which are not contaminated with aluminum, it is therefore advantageous to feed aluminum with the fluoride-chromate treatment to obtain an optimum concentration of soluble aluminum depending on the pH.

The aluminum may be fed in any suitable water soluble aluminum compound, examples being aluminum sulphate, aluminum chloride, and the like.

*Table I.—Water contaminated with aluminum (7 p. p. m.)*

STEEL

| Test | Treatment, p. p. m. | pH | Corrosion Observation | | Aluminum Sludge, cc./l. | Ave. Penetration, Inches/Year |
|---|---|---|---|---|---|---|
| | | | Type Attack | Tubercles | | |
| 1 | 0 | 5 | general | none | 18 | 0.153 |
| 2 | 60 NaF | 5 | pitting | present | 0 | 0.036 |
| 3 | 50 NaF—10C [1] | 5 | shallow pitting | do | 0 | 0.008 |
| 4 | 40 NaF—20C | 5 | none | none | 0 | 0.004 |
| 5 | 30 NaF—30C | 5 | do | do | 5 | 0.002 |
| 6 | 20 NaF—40C | 5 | shallow pitting | present | 7 | 0.002 |
| 7 | 60C | 5 | none | none | 19 | 0.002 |
| 8 | 0 | 6 | pitting and general | some | 15 | 0.193 |
| 9 | 60 NaF | 6 | do | do | 4 | 0.052 |
| 10 | 50 NaF—10C | 6 | almost none | almost none | 6 | 0.004 |
| 11 | 40 NaF—20C | 6 | none | none | 8 | 0.002 |
| 12 | 30 NaF—30C | 6 | do | do | 6 | 0.001 |
| 13 | 20 NaF—40C | 6 | almost none | almost none | 9 | 0.001 |
| 14 | 60C | 6 | many fine pits | present | 20 | 0.006 |
| 15 | 0 | 7 | pitting | do | 8 | 0.074 |
| 16 | 60 NaF | 7 | do | do | 9 | 0.099 |
| 17 | 50 NaF—10C | 7 | almost none | almost none | 9 | 0.002 |
| 18 | 40 NaF—20C | 7 | do | do | 9 | 0.001 |
| 19 | 30 NaF—30C | 7 | pitting | present | 8 | 0.002 |
| 20 | 20 NaF—40C | 7 | do | do | 11 | 0.001 |
| 21 | 60C | 7 | sl. pitting | do | 14 | 0.001 |
| 22 | 0 | 8 | pitting | do | 9 | 0.098 |
| 23 | 60 NaF | 8 | severe edge attack | do | 7 | 0.070 |
| 24 | 50 NaF—10C | 8 | sl. pitting | do | 8 | 0.002 |
| 25 | 40 NaF—20C | 8 | do | do | 10 | 0.003 |
| 26 | 30 NaF—30C | 8 | do | do | 11 | 0.002 |
| 27 | 20 NaF—40C | 8 | do | do | 10 | 0.002 |
| 28 | 60C | 8 | shallow pitting | do | 12 | 0.001 |
| 29 | 60 NaF | 5.5 | do | do | 0.5 | 0.048 |
| 30 | 60 NaF | 6.5 | scattered small pits | do | 7 | 0.050 |
| 31 | 20 Na₅P₃O₁₀<br>20 NaH₂PO₄<br>20 Na₂Cr₂O₇.2H₂O | 6 | pitting | do | 14 | 0.004 |

[1] C=Na₂Cr₂O₇.2H₂O.

COMPLEX FLUORIDES

The complex fluorides such as the fluoroborates and the fluorosilicates were tested in the absence of phosphate along with chromate and alone, and are not recommended. When reference is made herein to water soluble fluoride, therefore, it is intended to designate the material which forms the fluoride ion in water solution, rather than a compound which normally forms a complex ion.

In view of our invention and disclosure, variations and modifications to meet individual whim or particular need will doubtless become evident to others skilled in the art, to obtain all or part of the benefits of our invention without copying the method and composition shown, and we, therefore, claim all such insofar as they fall within the reasonable spirit and scope of our claims.

*Table II.—Water contaminated with aluminum (5. p. p. m.)*

COPPER AND ALUMINUM

| Test | Treatment, p. p. m. | pH | Corrosion Observation | | Ave. Penetration, Inches/Year | |
|---|---|---|---|---|---|---|
| | | | Tubercles | Pitting | Cu | Al |
| 1 | 40 NaF—20C[1] | 5 | none | none | | 0.010 |
| 2 | 40 NaF—20C | 5 | do | do | 0.002 | |
| 3 | 40 NaF—20C | 6 | do | do | | 0.013 |
| 4 | 40 NaF—20C | 6 | do | do | 0.002 | |
| 5 | 40 NaF—20C | 7 | few scattered. | slight | | 0.010 |
| 6 | 40 NaF—20C | 7 | none | none | 0.002 | |

[1] $C = Na_2Cr_2O_7 \cdot 2H_2O$.

*Table III*

| No. | Treatment, p. p. m. | | | | p. p. m. | | pH | Ave. Steel Penetration, In./Yr. | Pitting |
|---|---|---|---|---|---|---|---|---|---|
| | NaF | $Na_5P_3O_{10}$ | $Na_2HPO_4$ | $Cr^{+++}$[2] | Al | $H_2S$[1] | | | |
| 1 | No treatment | | | | 7 | 2 | 6 | 0.236 | present. |
| 2 | 60 | 2.5 | 2.5 | 3.6 | 7 | [3] 1.8 | 6 | 0.008 | absent. |

[1] Superimposed on corrosion water described in specification.
[2] From 10 p. p. m. $Na_2Cr_2O_7 \cdot 2H_2O$.
[3] 5$H_2S$ fed. 1.8 residual.

*Table IV.—Water free of Al*

| Test | Treatment, p. p. m. | Corrosion Observation | | Ave. Steel Penetration, Inches/Year |
|---|---|---|---|---|
| | | Type Attack | Tubercles | |
| 1 | None | general with some pitting | some | 0.063 |
| 2 | 20 $Na_5P_3O_{10}$ / 20 $NaH_2PO_4$ / 20 $Na_2Cr_2O_7 \cdot 2H_2O$ | general | none | 0.003 |
| 3 | 60 NaF | pitting | some | 0.069 |
| 4 | 40 NaF / 20 $Na_2Cr_2O_7 \cdot 2H_2O$ | do | do | 0.014 |
| 5 | 30 NaF / 30 $Na_2Cr_2O_7 \cdot 2H_2O$ | do | do | 0.009 |
| 6 | 20 NaF / 40 $Na_2Cr_2O_7 \cdot 2H_2O$ | slight pitting changing to general attack. | few | 0.007 |
| 7 | 10 NaF / 50 $Na_2Cr_2O_7 \cdot 2H_2O$ | none / none | none | 0.005 |
| 8 | 60 $Na_2Cr_2O_7 \cdot 2H_2O$ | pitting | large and aggressive. | 0.006 |

Conditions of test: Same as previous tests with $Al^{+++}$ omitted, and carried out at pH 6.0.

*Table V.—Effect of aluminum concentration*

| Test | Treatment, p. p. m. | Steel Ave. Penetration, Inches/Yr. | p. p. m. Al. | Corrosive Observation | | pH |
|---|---|---|---|---|---|---|
| | | | | Tubercles | Pitting | |
| 1 | 40 NaF—20C [1] | 0.003 | 3 | few | few pin point | 5 |
| 2 | 40 NaF—20C [1] | 0.002 | 5 | do | do | 5 |
| 3 | 40 NaF—20C [1] | 0.006 | 1 | many small | small on surf., large on edge. | 6 |
| 4 | 40 NaF—20C [1] | 0.005 | 3 | few | few | 6 |
| 5 | 40 NaF—20C [1] | 0.004 | 5 | none | none | 6 |
| 6 | 40 NaF—20C [1] | 0.004 | 1 | many small | many small | 7 |
| 7 | 40 NaF—20C [1] | 0.004 | 3 | many small, large at edge. | many small, some large. | 7 |
| 8 | 40 NaF—20C [1] | 0.006 | 5 | many large | large deep pits | 7 |

[1] C indicates $Na_2Cr_2O_7 \cdot 2H_2O$.

Having thus described our invention, what we claim as new and desire to secure by Letters Patent is:

1. The process of reducing the corrosion and sludging in a cooling water system, which system contains metal parts of the class consisting of iron, steel, copper base alloy and aluminum base alloy, and which system contains in the water at least 1 p. p. m. of aluminum ion, which comprises adding to the water containing such aluminum ion and in contact with such metal parts, water soluble fluoride compound in concentration between 10 and 200 p. p. m. expressed as sodium fluoride and water soluble chromate compound in concentration between 1 and 200 p. p. m. expressed as $Na_2Cr_2O_7 \cdot 2H_2O$, and maintaining in the water a pH between 5 and 8.

2. The process of claim 1, in which the concentration of water soluble fluoride compound is between 20 and 50 p. p. m. expressed as sodium fluoride, the concentration of water soluble chromate compound is between 10 and 40 p. p. m. expressed as $Na_2Cr_2O_7 \cdot 2H_2O$, and pH is between 5 and 6.5.

3. The process of claim 1, in which the relative concentration of fluoride compound and chromate compound is between 1/3 fluoride to 2/3 chromate and 1/6 fluoride to 5/6 chromate by weight.

4. The process of reducing the corrosion in a cooling water system, which water system includes metal parts of the class consisting of iron, steel, copper base alloy and aluminum base alloy, which comprises adding to the water and in contact with such metal parts, between 1 and 10 p. p. m. of aluminum ion, water soluble fluoride compound in concentration betwen 10 and 200 p. p. m. expressed as sodium fluoride, and water soluble chromate compound in a concentration between 1 and 200 p. p. m. expressed as $Na_2Cr_2O_7 \cdot 2H_2O$, and maintaining in the water a pH between 5 and 8.

5. The process of claim 4, in which the concentration of water soluble fluoride compound is between 20 and 50 p. p. m. expressed as sodium fluoride, the concentration of water soluble chromate compound is between 10 and 40 p. p. m. expressed as $Na_2Cr_2O_7 \cdot 2H_2O$, and the pH is between 5 and 6.5.

6. The process of reducing the corrosion and sludge in a cooling water system, which water system has metal parts in contact with the water of the class consisting of iron, steel, copper base alloy and aluminum base alloy, the water in the system containing at least 1 p. p. m. of aluminum ion and also containing a sulphide, which comprises adding to the water containing such aluminum ion and sulphide in the water system in which the water is in contact with such metal parts, water soluble fluoride compound in concentration between 10 and 200 p. p. m. expressed as sodium fluoride, water soluble chromate compound in concentration between 1 and 200 p. p. m. expressed as $Na_2Cr_2O_7 \cdot 2H_2O$ and between 1 and 20 p. p. m. of water soluble phosphate compound expressed as sodium tripolyphosphate.

7. The process of claim 6, in which the water soluble phosphate compound is a mixture of orthophosphate and polyphosphate.

8. The process of claim 6, in which the concentration of the trivalent chromium is between 0.4 and 7 p. p. m. in the water.

References Cited in the file of this patent

UNITED STATES PATENTS

| | | |
|---|---|---|
| 2,203,670 | Buzzard | June 11, 1940 |
| 2,332,209 | Enquist | Oct. 9, 1943 |
| 2,675,351 | Ulmer et al. | Apr. 13, 1954 |
| 2,711,391 | Kahler | June 21, 1955 |